(12) United States Patent
Vanstone et al.

(10) Patent No.: US 8,548,165 B2
(45) Date of Patent: Oct. 1, 2013

(54) METHOD OF COMPRESSING A CRYPTOGRAPHIC VALUE

(75) Inventors: Scott A. Vanstone, Campbellville (CA); Daniel R. Brown, Mississauga (CA)

(73) Assignee: Certicom Corp., Mississauga (CA)

( * ) Notice: Subject to any disclaimer, the term of this patent is extended or adjusted under 35 U.S.C. 154(b) by 22 days.

(21) Appl. No.: 13/283,463

(22) Filed: Oct. 27, 2011

(65) Prior Publication Data

US 2012/0039466 A1    Feb. 16, 2012

Related U.S. Application Data

(63) Continuation of application No. 12/169,795, filed on Jul. 9, 2008, now Pat. No. 8,073,139.

(60) Provisional application No. 60/950,235, filed on Jul. 17, 2007.

(51) Int. Cl.
*H04L 9/00* (2006.01)
*H04L 9/28* (2006.01)
*H04L 29/06* (2006.01)
*H04L 9/32* (2006.01)

(52) U.S. Cl.
USPC ............... 380/44; 380/28; 713/176; 713/155

(58) Field of Classification Search
USPC .................................. 380/44, 277
See application file for complete search history.

(56) References Cited

U.S. PATENT DOCUMENTS

| | | | |
|---|---|---|---|
| 5,497,423 A | 3/1996 | Miyaji | |
| 6,141,420 A | 10/2000 | Vanstone et al. | |
| 6,252,960 B1 | 6/2001 | Seroussi | |
| 6,490,352 B1 | 12/2002 | Schroeppel | |
| 6,738,878 B2 * | 5/2004 | Ripley et al. | 711/164 |
| 7,236,589 B2 | 6/2007 | Lauter et al. | |
| 7,471,792 B2 * | 12/2008 | Yamamichi et al. | 380/44 |
| 7,555,122 B2 * | 6/2009 | Moller et al. | 380/30 |
| 7,564,997 B2 * | 7/2009 | Hamid | 382/124 |
| 7,584,153 B2 | 9/2009 | Brown et al. | |
| 7,587,600 B2 * | 9/2009 | Bodensjo et al. | 713/176 |
| 7,599,491 B2 * | 10/2009 | Lambert | 380/30 |
| 2002/0044649 A1 | 4/2002 | Gallant et al. | |
| 2003/0037237 A1 | 2/2003 | Abgrall et al. | |

(Continued)

FOREIGN PATENT DOCUMENTS

WO    WO 2004/114587 A1    12/2004

OTHER PUBLICATIONS

Boneh, D. et al; "Identity-Based Encryption from the Weil Pairing"; SIAM J. of Computing; 2003; pp. 586 to 615; vol. 32, No. 3.

(Continued)

*Primary Examiner* — Saleh Najjar
*Assistant Examiner* — Feliciano Mejia
(74) *Attorney, Agent, or Firm* — Shahrzad Esmaili; Blake, Cassels & Graydon LLP

(57) ABSTRACT

A computer implemented method of compressing a digitally represented cryptographic value. The method comprising the steps of: (a) selecting a secret value; (b) performing a cryptographic operation on the secret value to generate the cryptographic value; (c) determining whether the cryptographic value satisfies the pre-determined criteria; and (d) repeating the sequence of steps starting at step (a) until the cryptographic value satisfies the pre-determined criteria.

5 Claims, 4 Drawing Sheets

(56) References Cited

U.S. PATENT DOCUMENTS

| | | |
|---|---|---|
| 2003/0194086 A1 | 10/2003 | Lambert |
| 2004/0010689 A1 | 1/2004 | Vanstone et al. |
| 2006/0153371 A1 | 7/2006 | Beeson |
| 2007/0053509 A1 | 3/2007 | Pezeshki et al. |
| 2007/0064932 A1 | 3/2007 | Struik et al. |
| 2007/0130472 A1 | 6/2007 | Buer et al. |
| 2008/0025500 A1 | 1/2008 | Izu et al. |
| 2008/0063190 A1 | 3/2008 | Campagna et al. |
| 2010/0005301 A1 | 1/2010 | Asano et al. |

OTHER PUBLICATIONS

Brown, D.R.L. et al.; "Provably Secure Implicit Certificate Schemes"; Research Report, University of Waterloo, Dept. of C&O; Nov. 2000. Available at www.cacr.math.uwaterloo.ca/techreports/2000/corr2000-55.ps.

Haller, N.; "The S/KEY One-Time Password System"; IETF RFC 1760; Feb. 1995. Available at www.ietf.org/rfc/rfc/760.txt.

Pintsov L. et al.; "Postal Revenue Collection in the Digital Age"; FC 2000; 2001; pp. 105 to 120; Springer-Verlag.

Shamir, A.; "Identity-Based Cryptosystems and Signature Schemes"; Advances in Cryptology: CRYPTO '84; pp. 47 to 53; Springer-Verlag.

Zimmerman, P.R.; PGPfone: Pretty good privacy phone owner's manual; Appendix E: Biometric Word Lists; Jan. 1996. Available at http://web.mit.edu/network/pgpfone/manual/index.html.

Hayami, J.; Search Report from corresponding PCT Application No. PCT/CA2008/001254; search completed Oct. 29, 2008.

Manet, Pascal; Supplementary Search Report from corresponding European Application No. 08772872.1; search completed Aug. 29, 2011.

Vanstone, S.A. et al.; "Short RSA Keys and Their Generation"; Journal of Cryptology; Jan. 1, 1995; pp. 101 to 114; vol. 8, No. 8; New York, U.S.A.

Lenstra, a.K.; "Generating Rsa Moduli with a Predetermined Portion"; Lecture Notes in Computer Science/Computational Science; Oct. 1, 1998; pp. 1 to 10; Springer, Germany; ISBN: 978-3-540-24128-7.

Examination report from corresponding European Application No. 08772872.1; Jul. 19, 2013.

\* cited by examiner

METHOD OF COMPRESSING A CRYPTOGRAPHIC VALUE

CROSS-REFERENCE TO RELATED APPLICATIONS

This application is a continuation of U.S. patent application Ser. No. 12/169,795 filed Jul. 9, 2008 which claims priority from U.S. Provisional Patent Application No. 60/950,235 filed on Jul. 17, 2007, both of which are incorporated herein by reference.

FIELD OF INVENTION

The invention relates generally to the field of encryption. In particular, the invention relates to a method of compressing a cryptographic value.

BACKGROUND OF INVENTION

Public key cryptography utilizes a public key and a private key that are mathematically related. The relationship is such that the public key can readily be computed from the private key but computation of the private key from the public key is considered infeasible. The private key is thus maintained secret. The keys are used in a variety of well known protocols to secure or sign messages.

As a cryptographic value, a public key or its representation generally is not easily manageable by a user. Generally speaking, cryptographic algorithms involve values that are random or indistinguishable from random characters within a certain space. People generally have difficulty with managing a long string of characters that resembles a random collection of letters and digits. To provide adequate security, the size of such a space is often chosen so that exhaustive search by computers of current technology becomes infeasible. A space of $2^{80}$ is considered out of reach today. Representing a cryptographic value in such a space generally takes at least 80 bits, or 10 bytes. A value of ten bytes corresponds to twenty hexadecimal digits. Some cryptographic values, such as elliptic curve public keys and hash values, must generally be twice as long as this to have an equal security level. The minimal security level would involve a representation of 40 hexadecimal digits. As computation power or computation techniques advances, longer representations will become desirable or necessary. Other cryptographic values, such as DSA and RSA keys, have even longer representations, with 256 hexadecimal digits in order to maintain the same security level.

Random values of such sizes, even just 20 hexadecimal digits, are quite difficult for users to manage without error. In particular, users may have difficulty 1. recalling such random values without assistance,
2. recognizing such random values even if seen before,
3. communicating such values by voice to other users, or
4. transcribing such values via print or display.

Because of these difficulties, user interfaces to cryptographic protocols seldom give users access to the cryptographic values. This may be because it is generally believed that such access would be useless. Occasionally, cryptographic values are made optionally accessible to users. The commonest cryptographic value that users are likely to encounter is a public key. Many protocols optionally display a representation of a public key in a certificate to the user.

For example, when an SSL or TLS client in a web browser receives a server certificate which is not signed by a trusted certification authority ("CA"), the SSL or TSL client commonly displays a warning to the user. The warning message typically notifies the user that the certificate cannot be trusted, displays the name of the purported owner and issuer of the certificate. Often an option is given to the user to either not trust the certificate, trust the certificate once, or to always trust it. Some clients also display the public key in hexadecimal or Base64 form to the user. Users generally cannot make use of the displayed public key, because they have nothing to corroborate against. Even if the user did have some authentic source to verify the public key against, a hexadecimal or Base64 representation would make the verification a nuisance.

These warning messages present a danger to users. Suppose a user tries to revisit a familiar secure but uncertified site, but accidentally misspells the web address. An attacker could create a web-site at the mistaken address. The attacker could create a web page that looks identical the correct web-site. The attacker can also create a server certificate for the web-site. The attacker may not be able to get the server certificate certified by a trusted CA, because the trusted CA may do due diligence against such attacks before issuing server certificates. However, the attacker can issue a certificate to itself.

When a browser client encounters such a certificate, it will recognize that the certificate is not certified by a trusted CA and accordingly warn the user. Some users may ignore the warning message and connect to the site regardless. Other users may reject the web-site, without regard to the warning. A third class of users, perhaps the majority, may glance at the name of the certificate presented in the warning message and choose to accept the certificate once (for one session).

This third class of users would inspect the name. Because the certificate has been issued by the attacker, the attacker can choose a valid name, one for the correct site. If the browser matches the name against the URL, then the attacker can use the matched URL. The false URL is very close to the true URL, however, so the user may not notice the difference. (Some browsers might not re-display a correctly matched URL in the warning message, since it is already displayed in the address line of the browser.)

Therefore it is likely that this third class of user will accept the certificate, at least for one session. This is made more likely by the fact that many legitimate web-sites cannot afford to purchase server certificates from CAs, but still want encryption, so instead just issue their own certificates. Many users have been accustomed to such sites, and are more likely to accept certificates.

The negative consequence of accepting the attacker's certificate is that the user may think he or she is communicating with the true web-site. The user may obtain false information from the false web-site. The user may also enter information into the false web-site. In particular, the user may enter a password. The attacker may obtain the password, and use it to impersonate the user at the true web-site. If the true web-site is an on-line banking site, the attacker may be able to withdraw funds from the user's bank account.

Solutions have been proposed in the context of one-time passwords that are hashes of salted conventional passwords. In one system, a stream of 64 bits is divided into six segments of 11 bits. Each segment is then rendered as a word taken from a dictionary of 2048 words. The words chosen have four or fewer letters, with the purpose to make them easier to type, so that the number of key strokes is limited. The aim is to keep the error rate lower than for hexadecimal or Base64 data, because the words chosen are valid English words.

A number of security deficiencies, however, exist in using lists of English words. Audio recordings of speech can be re-spliced to form word lists. Thus if speech is used for authentication then alternative representations may be advantageous. At a textual level, word lists may not offer as much efficiency or may not fit well enough with existing text formats, such as electronic mail addresses.

It is an object of the present invention to mitigate or obviate at least one of the above mentioned disadvantages.

SUMMARY OF INVENTION

In one aspect of the invention, there is provided a general method of compressing a cryptographic value that satisfies a pre-determined criteria. The method comprising the steps of: (a) selecting a secret value; (b) performing a cryptographic operation on said secret value to generate the cryptographic value; (c) determining whether the cryptographic value satisfies the pre-determined criteria; and (d) repeating the sequence of steps starting at step (a) until the cryptographic value satisfies the pre-determined criteria.

In one embodiment, public keys or public key certificates are compressed according to this method of generating a cryptographic value. The pre-determined criteria is a compression criteria. It can be, for example, a requirement that a cryptographic value has 40 trailing zeroes. Compression of a public key or a public key certificate confines the public key or the certificate to a restricted space. To compress a public key certificate, the certificate authority who issues the certificate does an iterated computation of exhaustively computing and testing candidate values of public/private key pairs exhaustively until one that gives a compressed certificate is found. To compress a public key, its owner can do a similar exhaustive search of public/private key pairs.

In other aspects the invention provides various combinations and subsets of the aspects described above.

BRIEF DESCRIPTION OF DRAWINGS

For the purposes of description, but not of limitation, an embodiment or embodiments of the invention will now be explained in greater detail by way of example with reference to the accompanying drawings, in which.

DETAILED DESCRIPTION OF EMBODIMENTS

Figure 1:
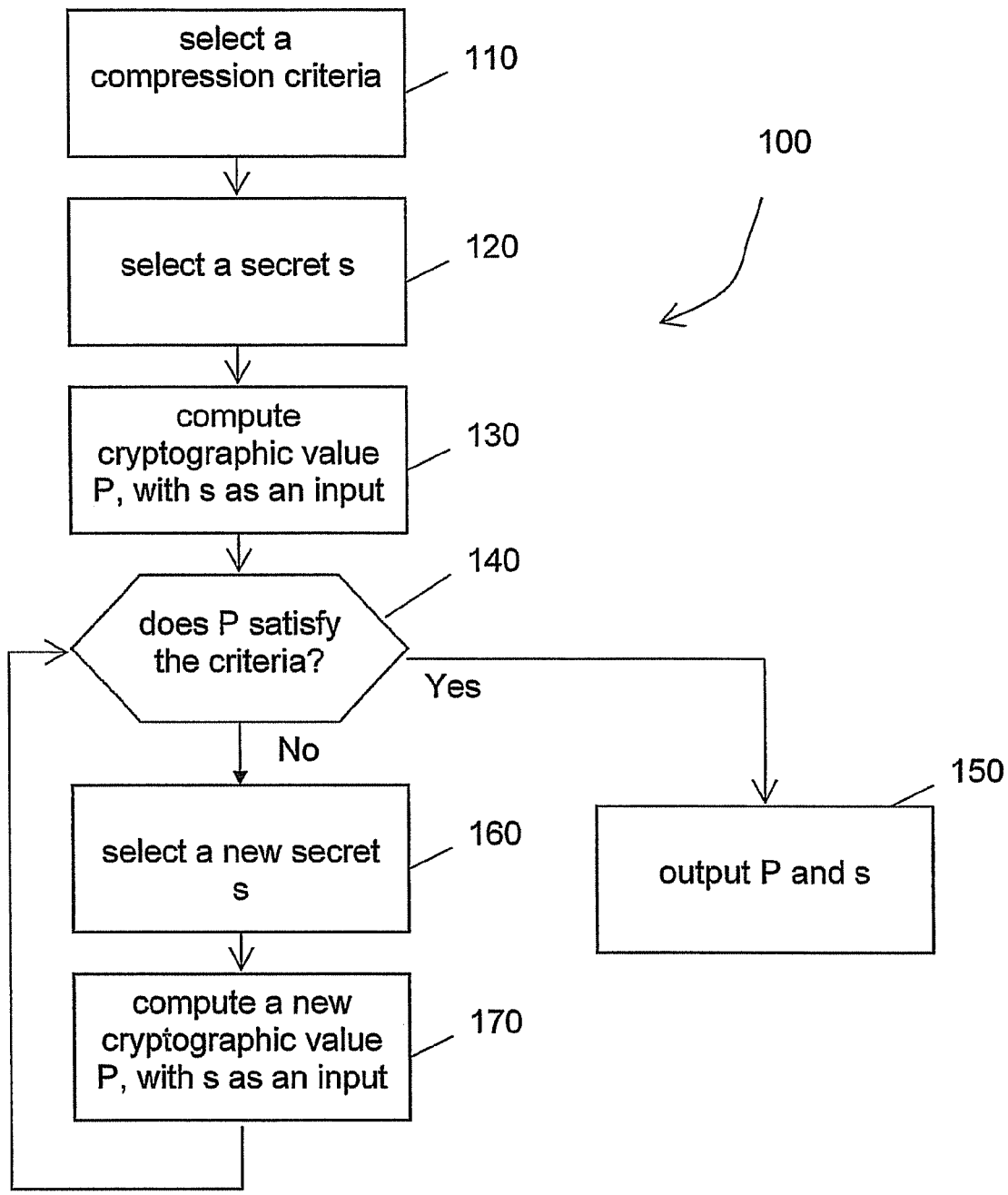
FIG. 1 shows schematically a process for compressing cryptographic values, such as public keys or implicit certificates.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

FIG. 1 shows schematically a process for compressing cryptographic values, such as public keys or public key certificates, so that they are manageable for users. Compression of a cryptographic value, such as a public key or a public key certificate, is to confine it to a restricted space. Generally speaking, cryptographic algorithms involve values that are random within a certain space, or are indistinguishable from such random values. These spaces are of a size that makes exhaustive search infeasible by computers of current technology. A space of $2^{80}$ is considered out of reach today. Representing a cryptographic value in such a space generally takes at least 80 bits, or 10 bytes. Compression is to confine the cryptographic value to a subspace of such spaces so that a cryptographic value in such a space can be expressed in a shorter representation.

The compression process 100 starts at step 110 by selecting a compression criteria for a cryptographic value. The criteria may be rule based, for example, by requiring all public keys to be selected from a pre-determined collection of words or pseudowords. The criteria may also be pattern based, for example, by requiring the selected cryptographic value to have 40 trailing zeros. The criteria may also be to select a particular string or text for a given number of trailing characters or the entire cryptographic text, for example, to correspond to an e-mail address or a website address. The criteria may also be based on any other user selected requirements that may make a cryptographic value more manageable. Of course, the criteria may also be pre-determined in another process or fixed by a third party, such as a request submitted to the system. The purpose of the criteria is that certain bits of the cryptographic value can be omitted during transmission and storage and then reconstructed prior to a further cryptographic operation, for example, decryption, to be performed on the cryptographic value.

At the next step 120, a private key or other secret value that is required in a cryptographic operation is selected or generated. The nature of the secret value corresponds to the cryptographic operation. For example, a user may select a private key d at this step for finding a manageable public key. Alternatively, a certification authority may select an initial secret contribution to a requester's private key if an implicit certificate is to be compressed, or, when an encrypted text is required, the secret is an encryption key used to encrypt the text.

Next at step 130, a cryptographic value is computed, incorporating the secret value as at least one of the inputs. For example, one may compute a public key P from a private key d using elliptic curve cryptography ("ECC"). The public key P may be computed from $$P=d*G$$

where G is a generator of a selected elliptic curve. Of course, at this step, depending on the needs, the cryptographic value to be computed is not limited to a public key. It may be, for example, a public certificate as indicated above.

Next, at step 140, the computed cryptographic value is evaluated to determine if it meets the pre-selected criteria. For example, one may verify at this step whether the public key has 40 trailing zeros, or if the cryptographic value matches the pre-selected text, such as an e-mail address. If the criteria is met, both the secret and the cryptographic values are output to the user at step 150 and the process terminates. For example, the private/public key pair may be provided to the user. As the trailing bits can be removed and later reconstructed, the compressed cryptographic value requires less bits to represent. This tends to make it more manageable for a human recipient as it is generally difficult for human users to manage a long string of apparent random bits.

If the criteria is not met, the process is iterated by selecting a new secret value and computing a corresponding cryptographic value until the criteria is met. In certain applications, such as searching for a compressed elliptic curve public key, the cryptographic value is a constant multiple of the secret value. The secret value may be simply incremented at step 160 to arrive at a new value and the cryptographic value may be correspondingly incremented at step 170, in order to avoid the need of a more expensive multiplication operation. The process then returns to step 140 until a secret value is found so that the corresponding cryptographic value is in a compressed form, namely satisfying the compression criteria selected at the beginning of the process.

Figure 2:
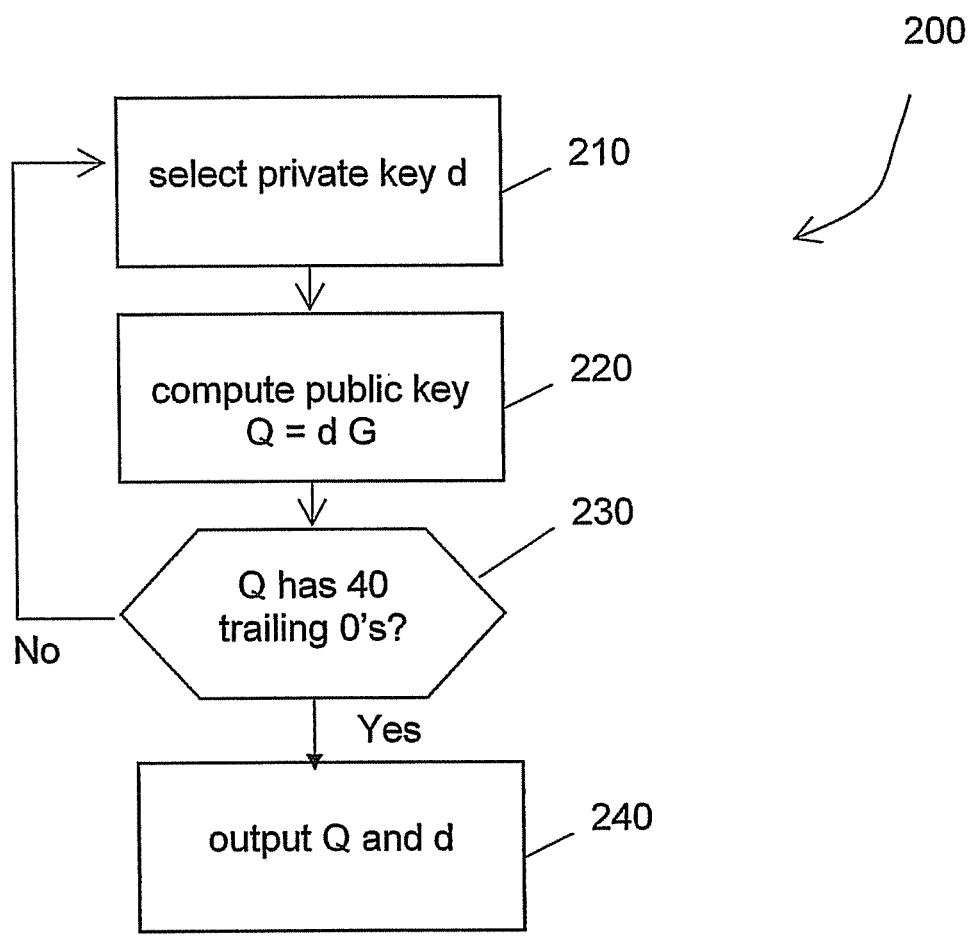
FIG. 2 illustrates a process of compressing a public key that has 40 trailing zeros, as a special case of the process shown in FIG. 1.

As an example, FIG. 2 shows a process 200 of finding a public key that has 40 trailing zeros. This is accomplished by a trial and error process. For example, suppose one wants a compressed elliptic curve public key Q whose last 40 bits (five bytes) are zero. In this example, G is the generator of a selected elliptic curve of order n. The following process can be followed to find such a public key:

1. Generate a random private key d∈[1, n−1] (step 210)
2. Compute the corresponding public key Q=d G (step 220)
3. If the public key Q, ends in 40 bits of value zero (step 230) then stop and output the public and private key pair (d, Q) (step 240)
4. Otherwise, go back to the start of the process, step 210

This process takes on average $2^{40}$ iterations. The process, as described, thus takes approximately $2^{40}$ elliptic curve scalar multiplications.

Figure 3:
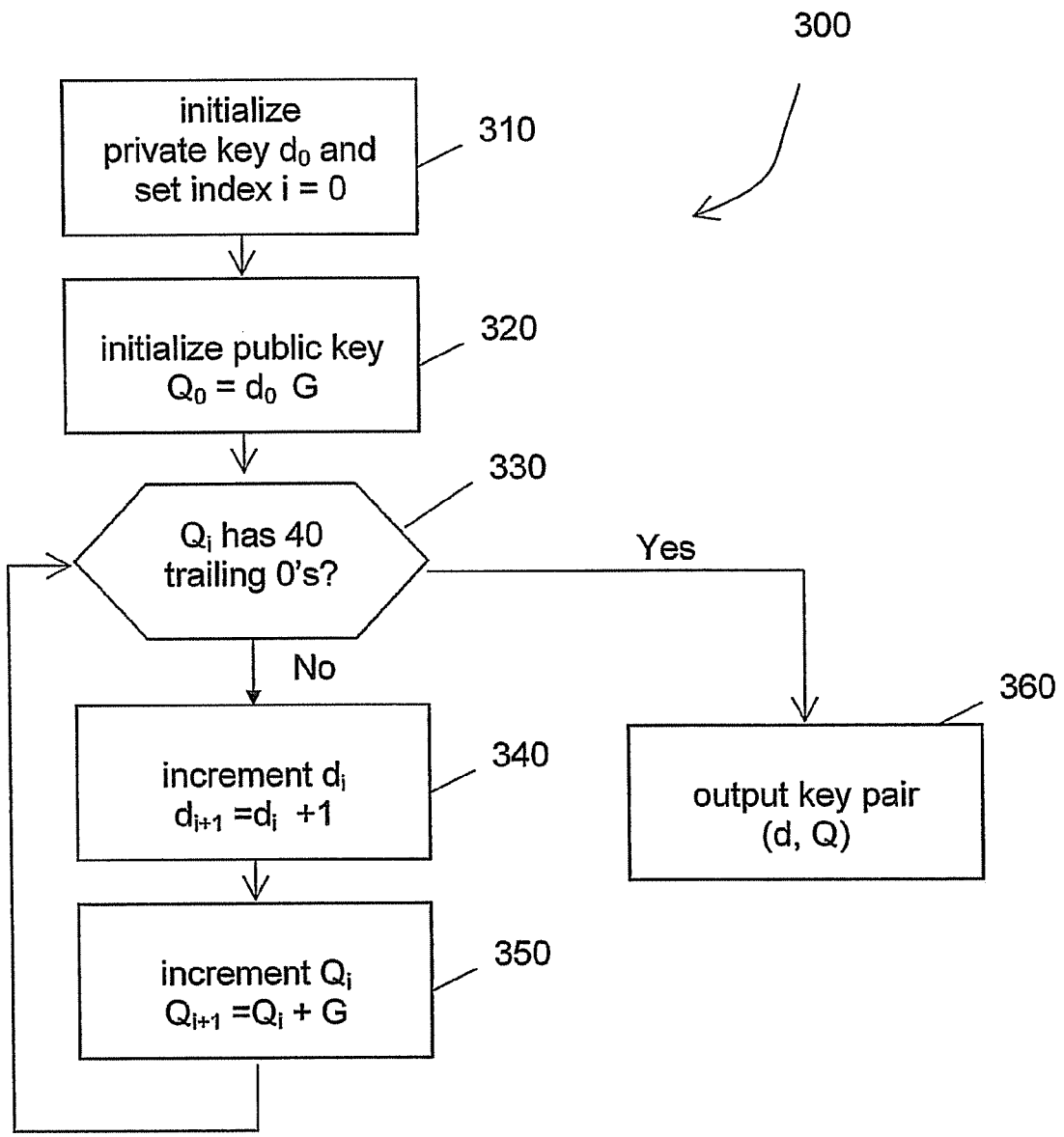
FIG. 3 illustrates an improved process modified from that shown in FIG. 2.

The process 200 described above can be improved to yield possibly an approximate hundredfold improvement. The modified process 300 shown in FIG. 3 also starts from initializing a private/public key pair but it takes advantage of the multiplicative relationship between the private and public keys to avoid the multiplication operations otherwise required during the exhaustive search. The modified process 300 has the following steps:

1. Initialize a private/public key pair $(d_0, Q_0)$, namely, first generate a random private key $d_0 \in [1,n-1]$ and set index i to 0 (step 310), and then compute the corresponding public key $Q_0 = d_0$ G (step 320);
2. In a loop, first evaluate whether the public key $Q_i$ meets the compression criteria (step 330), i.e., if it ends in 40 bits of zero;
3. If $Q_i$ is not in a compressed form, then
   (a) Increment the private key: $d_{i+1}=d_i+1$ (step 340)
   (b) Increment the public key: $Q_{i+1}=Q_i+G$ (step 350)
   (c) Increment i by one
   (d) Return to the beginning of the loop (i.e., step 330)
4. Output the private/public key pair (d, Q) when a compressed key Q is found (step 360)

This process also takes about $2^{40}$ iterations. Each iteration, however, costs mainly just one elliptic curve point addition. The saving of computation costs depends on the size of n. In view of today's technology and the corresponding security level required of an encryption system, the saving can be approximately a hundred times faster than the process 200 based on elliptic curve multiplication, but would be greater if a longer key is required for better security, for example. The number of iterations $2^{40}$ mentioned here is used in this example because it is considered to be just within reach of today's desktop computers (running for several days). With a different number of iterations, a different savings will be realized.

If public keys in a given system are generated in this manner, then they can be compressed by omission of the last 40 bits. For example, today 22 byte elliptic curve keys are commonly used. With 40 trailing zero bits, public keys compress to 17 bytes. Different criteria on the public key can be used. For example, 32 trailing zero bits can be sought, or some other fixed pattern may be used. If a different criteria is used, the process described above will be adjusted so that at each iteration, it is the selected criteria that is tested.

Compression comes at a one-time computational cost during key generation. This cost can be amortized over the life of a public key. Key generation and certification is a generally one-time operation. The extra cost of searching for a suitable key may be well worth the savings achieved by reduced storage and transmission costs.

The methods described above in connection with FIGS. 1 to 3 can be applied to generation of digital signatures in certificates by certification authorities. By doing this, certificates can be compressed. Certificates often need to be stored or transmitted. Compressing certificates help reducing the associated storage and transmission costs. Also, in theory certificate chains can be very long, in which case, compression generally tends to be beneficial.

In a public key system, a public-key certificate is a data structure that consists of at least two parts, a data part and a signature part. The data part contains cleartext data that includes at least the public key to be certified and a piece of information indicating the identity of the public key's owner. The signature part consists of a digital signature over the data part. The digital signature is that of the certification authority, thereby binding the key owner's identity to the key certified.

Figure 4:
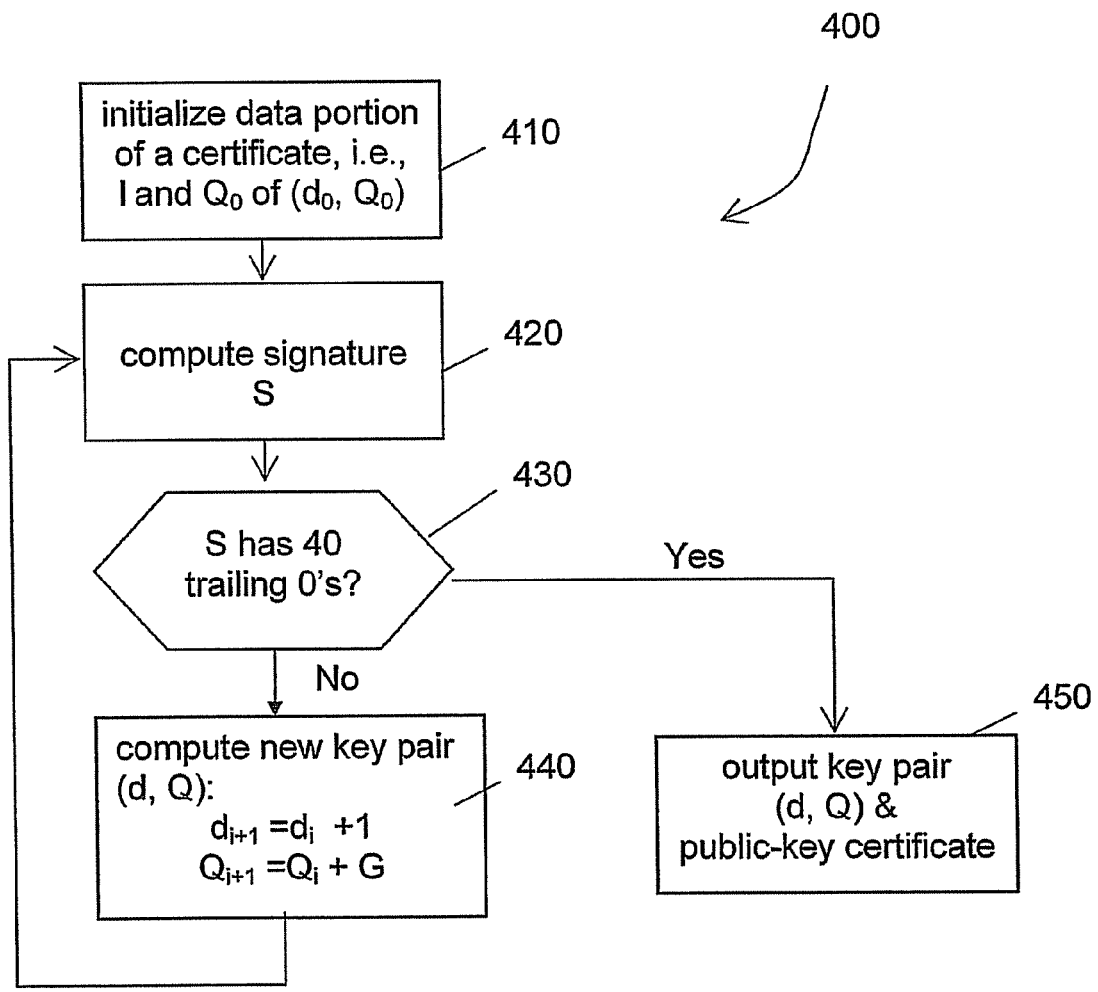
FIG. 4 illustrates a process of compressing a public-key certificate.

The certification authority ("CA") already has its public key and private key selected and, in general, already has its public key publicized. The certificate of a public key of a subject entity therefore can be compressed if a suitable public key of the subject entity is appropriately selected, such as in accordance with the general procedure outlined in FIG. 1. FIG. 4 illustrates schematically how a public-key certificate can be compressed in an example embodiment. In this example, the compression criteria is to find a certificate that has 40 trailing zeros.

The CA initializes the process 400 by initializing the data part. During initialization 410, the CA selects an initial private key $d_0$ of the subject and computes the corresponding initial public key $Q_0$. The CA also selects the identity information I to be included in the certificate. At step 420, the CA signs the initial data part to obtain an initial signature S. The signature S computed is evaluated at step 430 to determine whether it has 40 trailing zeros, i.e., to determine if the signature meets the compression criteria.

In general, an arbitrary initial public key does not lead to a compressed certificate. The CA then finds a new key pair at step 440. Advantageously, the CA can increment the private key and compute the corresponding public key by adding a corresponding increment:

$$d_{i+1}=d_i+1$$

$$Q_{i+1}=Q_i+G$$

Next, the process returns to step 420 and a digital signature corresponding to the new public key is computed. The new signature is evaluated at step 430 to determine whether it meets the criteria. If it does, the CA terminates the process and provides the subject entity with the key pair and the compressed public key certificate at step 450. If the signature does not meet the criteria, steps 420, 430, and 440 are repeated until a compressed certificate is found. The public-key certificate so obtained is compressed in that its signature part is compressed.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A computer implemented method of generating a digitally represented cryptographic value, a pre-selected portion of which comprises a string of characters or bits, the method comprising the steps of:
   (a) selecting a secret value;
   (b) performing a cryptographic operation on said secret value to generate the cryptographic value;
   (c) testing whether the pre-selected portion matches a user-specified string of characters or bit pattern; and
   (d) repeating the sequence of steps starting at step (a) until the pre-selected portion matches the user-specified string of characters or bit pattern.

2. The method of claim 1, wherein the user-specified string of characters or bit pattern is a sequence of pre-selected characters.

3. The method of claim 1, wherein the user-specified string of characters or bit pattern is a sequence of trailing zeros.

4. The method of claim 1, wherein the cryptographic value is used as a URL, a website address or an electronic mail address.

5. The method of claim 1, wherein the cryptographic value is a public key, a digital signature, a public key certificate, or an encrypted text.

* * * * *